United States Patent
Fu et al.

(10) Patent No.: US 12,104,225 B2
(45) Date of Patent: Oct. 1, 2024

(54) METHOD FOR RECOVERING RARE EARTH ELEMENTS FROM NDFEB WASTE AND USE OF FERRIC OXIDE AS RAW MATERIAL OF MANGANESE-ZINC FERRITE

(71) Applicants: CHONGQING SHANGJIA ELECTRONIC CO., LTD., Chongqing (CN); CHONGQING UNIVERSITY, Chongqing (CN)

(72) Inventors: Liang Fu, Chongqing (CN); Shuchun Li, Chongqing (CN); Fusheng Pan, Chongqing (CN); Hualin Xie, Chongqing (CN); Xinren Liao, Chongqing (CN); Juncai Ma, Chongqing (CN); Ping Li, Chongqing (CN); Zhan Xu, Chongqing (CN)

(73) Assignees: CHONGQING SHANGJAI ELECTRONIC, Chongqing (CN); CHONGQING UNIVERSITY, Chongqing (CN)

( * ) Notice: Subject to any disclaimer, the term of this patent is extended or adjusted under 35 U.S.C. 154(b) by 0 days.

(21) Appl. No.: 18/316,192

(22) Filed: May 11, 2023

(65) Prior Publication Data
US 2024/0200165 A1   Jun. 20, 2024

(30) Foreign Application Priority Data
Jul. 11, 2022   (CN) .......................... 202210810708.8

(51) Int. Cl.
| | | |
|---|---|---|
| C22B 59/00 | (2006.01) | |
| C22B 1/24 | (2006.01) | |
| C22B 7/00 | (2006.01) | |

(52) U.S. Cl.
CPC ............... *C22B 59/00* (2013.01); *C22B 1/24* (2013.01); *C22B 7/002* (2013.01); *C22B 7/004* (2013.01)

(58) Field of Classification Search
CPC ............ C22B 1/24; C22B 7/002; C22B 7/004
See application file for complete search history.

(56) References Cited

U.S. PATENT DOCUMENTS

| | | |
|---|---|---|
| 4,556,165 A | 12/1985 | Yamawaki et al. |
| 5,100,486 A | 3/1992 | Krikorian et al. |
| 2015/0047745 A1 | 2/2015 | Kobayashi et al. |
| 2015/0368114 A1 | 12/2015 | Zhang et al. |
| 2018/0369827 A1 | 12/2018 | Ahn et al. |

FOREIGN PATENT DOCUMENTS

| | | | |
|---|---|---|---|
| CN | 104087755 A | | 10/2014 |
| CN | 108411122 A | | 8/2018 |
| CN | 112981108 A | | 6/2021 |
| CN | 115044786 A | * | 9/2022 |
| JP | 2010100441 A | | 5/2010 |

OTHER PUBLICATIONS

Marins et al., J. Mater. Sci., (2011), v46, 1640-1645.*
Genghua Wu: "A Study on Phase Diagram of Pseudo-binary Systems KBe2F5-KAlF4 and KBe2F5-K3AlF6", Journal of Anqing Normal College (Natural Science Edition), vol. 9, No. 1, pp. 29-33 (2003).

* cited by examiner

*Primary Examiner* — Yong L Chu

(57) ABSTRACT

Provided are a method and molten salt system for recovering rare earth elements from NdFeB waste and use of ferric oxide as a raw material of a manganese-zinc ferrite. The molten salt system comprising the following components in percentage by weight: 40% of $K_3AlF_6$ or $Na_3AlF_6$, 40% of $KBe_2F_5$, and 20% of $KAlF_4$. By adopting the three-component molten salt system of the present invention, recovery rates of rare earth elements extracted from NdFeB waste all can reach 98% or above. By adopting the three-component molten salt system, extraction temperature is 100-400° C. lower than that of all current similar halogenation methods, and extraction time is fold shorted to 1-3 h. The reduction of the extraction temperature and the shortening of the melting time greatly reduce the energy consumption of extracting rare earth elements from NdFeB waste, and the economic benefits are remarkable.

4 Claims, No Drawings

METHOD FOR RECOVERING RARE EARTH ELEMENTS FROM NDFEB WASTE AND USE OF FERRIC OXIDE AS RAW MATERIAL OF MANGANESE-ZINC FERRITE

BACKGROUND OF THE INVENTION

1. Technical Field

The present invention belongs to the field of resource reuse of industrial waste, in particular to a method for recovering rare earth elements from NdFeB waste and a molten salt system.

2. Description of Related Art

FeB permanent magnetic material which is a tetragonal crystal ($Nd_2Fe_{14}B$) composed of neodymium, iron and boron has the advantages of light weight, low price, good magnetic energy product and coercivity and high energy density. As a magnetic material with the best comprehensive magnetic properties at present, the FeB permanent magnetic material has been widely used in the fields of national defense and military industry, aerospace, medical devices, electronic information and metallurgical engineering. In 2021, the output of sintered NdFeB blanks in China was 207,100 tons with a year-on-year increase of 16%, and the output of bonded NdFeB was 9,380 tons with a year-on-year increase of 27.2%. The rapid growth of NdFeB permanent magnet materials has accelerated the generation of NdFeB waste and about 30% of waste will be generated in alloy smelting, sintering and cutting of the alloy smelting and sintering process.

As a non-renewable important strategic resource, rare earth is not only used in permanent magnetic materials, but also used as doping elements in soft ferrite materials, which can effectively replace iron ions on the octahedral position and change the structure of soft ferrite, thereby improving the magnetic properties of the soft ferrite material. For example, the doping of rare earth element neodymium (Nd) can reduce the grain size, reduce the porosity, and increase the lattice constant and mass density. Doping of rare earth elements in an appropriate amount can effectively control the grain growth of soft ferrite and promote the layered growth of grain boundaries. The content of rare earth element Nd in NdFeB permanent magnet material is about 27%. The NdFeB permanent magnet material also contains about 3% of rare earth elements such as praseodymium and dysprosium, and also contains nearly 70% of Fe element. The rare earth elements in recovered NdFeB waste can be used as doping elements of a manganese-zinc ferrite, and the main element Fe in recovered NdFeB waste can be used as the main element of the manganese-zinc ferrite. Therefore, NdFeB waste can be almost completely recycled and reused to prepare the manganese-zinc ferrite.

At present, the rare earth elements of NdFeB waste are mainly recovered by a roasting oxidation method where the rare earth elements are separated by acid leaching, solvent extraction, precipitation and roasting. According to the principle of the method, first rare earth elements are converted into corresponding oxides (Fe and B elements are converted into $Fe_2O_3$ and $B_2O_3$ respectively, the complete oxidation temperature is 800° C., and the oxidation products also contain a small amount of $NdFeO_3$ and $NdBO_3$. Then, under high temperature (900° C. or higher) conditions, rare earth oxides completely form $NdFeO_3$ and $NdBO_3$. Based on the fact that $Fe_2O_3$ is insoluble in hydrochloric acid, while rare earth compounds $NdFeO_3$ and $NdBO_3$ are easily soluble in hydrochloric acid, thereby realizing the separation of rare earths from the main element Fe. However, a small amount of Fe is inevitably dissolved in the hydrochloric acid leaching process. Since sulfuric acid extraction requires strict control over the amount of sulfuric acid and roasting in an atmosphere, the operation is complex and cumbersome and the pollution is difficult to control.

Recovery processes of NdFeB waste mainly include pyrometallurgy and hydrometallurgy, in which pyrometallurgy uses processes such as oxidation or chlorination to change the chemical state of elements in NdFeB waste and recover rare earth elements at high temperatures. The pyrometallurgy is environmentally friendly and has a short process. With the advantages of large processing capacity and relatively short process, the pyrometallurgy is currently a common solution for industrially treating NdFeB waste. However, the pyrometallurgy requires a high reaction temperature and takes a long time for high-temperature roasting, resulting in high energy consumption in the recovery process, low recovery rate of rare earth elements, and high requirements on material quality. So far, the recovery of rare earth elements in NdFeB waste by pyrometallurgy has not been applied industrially.

BRIEF SUMMARY OF THE INVENTION

In view of the existing technical problems, a first objective of the present invention is to provide a molten salt system for recovering rare earth elements from NdFeB waste, and a second purpose is to provide a method for recovering rare earth elements from NdFeB waste.

In order to achieve the above first object, the present invention is implemented through the following technical solution: a molten salt system for recovering rare earth elements from NdFeB waste, comprising the following components in percentage by weight: 40% of $K_3AlF_6$ or $Na_3AlF_6$, 40% of $KBe_2F_5$, and 20% of $KAlF_4$.

The second object of the present invention is achieved through the following technical solution: a method for recovering rare earth elements from NdFeB waste, comprising the following steps:

1) crushing NdFeB waste into fine particles with a particle size of 3-5 mm, thoroughly mixing the fine particles with the molten salt system of claim 1, heating the mixture in an electric furnace to 330° C. until the three-component molten salt system begins to melt, wherein as the temperature rises, a liquid phase gradually increases, and the fluidity of the material is improved; and 2) then, rapidly heating the material to 800-850° C. or 900-950° C. within 10 min, holding the temperature for 1-3 h so that rare earth elements in the NdFeB waste are fluorinated into rare earth fluorides which are dissolved in the molten salt and Fe element in the NdFeB waste deposits in a lower layer of the molten salt in the form of oxides; and carrying out solid-liquid separation to separate the rare earth fluorides from the precipitate to obtain a solid precipitate ferric oxide, thereby realizing the separation of Fe from rare earth elements.

In the above solution, the liquid molten salt after solid-liquid separation is cooled to room temperature and then crushed and ball-milled to more than 200 meshes; sodium hydroxide is then added according to a mass ratio of molten salt to sodium hydroxide being 1:1; the material is roasted for conversion at 300-450° C. for 2-4 h and then cooled to room temperature; water is added to wash away water-soluble salts of fluorine, aluminum, beryllium, potassium, sodium and the like; the material is filtered, 2-6 mol/L hydrochloric acid is added to the residue to leach rare earth elements, and filtering is then carried out to obtain pure rare earth element solutions with an impurity content of 0.5%.

In the above solution, the mass ratio of the hydrochloric acid added to the filter residue is 15:1-5:1.

In the above solution, after the addition of hydrochloric acid, the reaction is carried out at a temperature of 25-90° C. for 0.5-2 h.

In the above solution, the mass ratio of NdFeB waste to the molten salt system is 1:10.

The solid precipitate obtained in step 2) is dissolved with concentrated sulfuric acid, and Fe is converted into carbonates by using ammonium bicarbonate as a precipitant; calcination is then carried out by using a suspension low-temperature instantaneous firing system (ZL 201110100752.1) at a temperature of 800-900° C. for 1-3 s, thus obtaining ferric oxide. Rare earth elements are hardly detected in the solid precipitate obtained after solid-liquid separation, and a small amount of boron contained in the NdFeB waste reacts with fluoride ions during the high-temperature melting process to form boron trifluoride that is volatilized. Therefore, the solid precipitate obtained by solid-liquid separation mainly includes ferrite. The obtained ferric oxide has a purity greater than 99.5%, providing a high-quality iron source for the preparation of soft ferrite.

The present invention further provides use of the prepared ferric oxide as a raw material of manganese-zinc ferrite.

In the molten salt system of the present invention, the eutectic point formed by a two-component system formed by $KBe_2F_5$—$KAlF_4$ coexistence will be reduced to 330° C., and the appearance of the low-temperature liquid phase increases the contact chance of molten salt and NdFeB waste, thereby improving the reaction speed. As the temperature increases, $KBe_2F_5$ gradually decomposes into KF and $BeF_2$, in which $BeF_2$ exists in the melt in a covalent molecular state, while KF exists in the melt in an ion state. The strong corrosiveness of $K^+$ and $F^-$ comes from the penetration of $K^+$ and the fluidity of $F^-$. Under the impetus of $K^+$, $F^-$ penetrates into NdFeB waste and has a fluorination reaction with rare earth elements to generate rare earth fluorides. However, Fe, the main element in NdFeB waste, does not react with $F^-$, and will still be in its original state or partially oxidized to form oxides in the NdFeB waste. Therefore, the addition of $KBe_2F_5$ reduces the eutectic point of the entire reaction system, and the $F^-$ generated by the decomposition provides a fluorine source for the formation of rare earth fluorides. In addition, the permeability of $K^+$ produced by dissociation promotes the fluorination process of rear earth elements. Adding $KAlF_4$ forms a simple eutectic two-component system together with $KBe_2F_5$ on the one hand, lowering the primary crystal temperature of the molten salt system; on the other hand, the stability and fluidity of liquid $KAlF_4$ are excellent, and very few $K^+$ and $AlF_4^-$ produced by dissociation mainly function to always provide superfluid physical properties throughout the whole process of the reaction, and cooperate with the penetration of $K^+$ and the fluidity of $F^-$, so that the fluorination reaction of NdFeB waste begins to take place at a low temperature, and the reaction process is accelerated. The main function of $K_3AlF_6$ is to selectively extract the rare earth fluorides generated by the reaction from the NdFeB waste in a molten state. Therefore, in the heating solution of the present invention, a rapid heating program (rapidly heating to 800-850° C. within 10 min) is employed to timely transfer the rare earth fluorides produced by the reaction from the precipitate layer at the lower layer of the molten salt to the liquid phase melt at the upper layer of the molten salt.

In the technical solution of the present invention, $K_3AlF_6$ is used as an extractant of rare earth fluorides, and a high ratio of $K_3AlF_6$ corresponds to a higher capacity, but the energy consumption required to maintain $K_3AlF_6$ in a molten state increases. $KBe_2F_5$ provides a fluorine source for rare earth elements in NdFeB waste, and if the ratio of $KBe_2F_5$ is too low, the rare earth elements will not be converted completely. $KAlF_4$ basically does not participate in the reaction and mainly functions to improve the fluidity of the reaction material. Since $KAlF_4$ will not be gasified at a temperature of 850° C. and the loss of $KAlF_4$ in the reaction process is low, the ratio requirement of $KAlF_4$ in the entire reaction system is obviously lower than that of $K_3AlF_6$ and $KBe_2F_5$. Therefore, the molten salt system of the present invention comprises 40% of $K_3AlF_6$, 40% of $KBe_2F_5$ and 20% of $KAlF_4$.

The reaction temperature affects the extraction time. A high temperature will speed up the reaction, and the required reaction time will be shortened when the rare earth elements are completely extracted. On the contrary, the reaction rate of the rare earth fluorides will slow down at a low temperature, and the corresponding reaction time will be increased. In order to reduce the volatilization loss of $KAlF_4$, increase the recovery rate of rare earth elements, and reduce the energy consumption of the reaction, when $K_3AlF_6$ is selected, the final reaction temperature is controlled at 800-850° C., and the extraction time is 1-3 h.

If $Na_3AlF_6$ is used, the extraction temperature should be increased from 800-850° C. to 900-950° C., and the extraction time is 1-3 h too.

Beneficial Effect (1) In use of the molten salt system of the present invention, by controlling the temperature, heating time, ratio of NdFeB waste to molten salt, and the ratio of components of the molten salt, the recovery rate of rare earth elements extracted from NdFeB waste can reach 98% or above.

(2) By adopting the molten salt system of the present invention, the extraction temperature is 100-400° C. lower than that of all current halogenation methods, and the extraction time is fold shorted to 1-3 h.

(3) The reduction of the extraction temperature and the shortening of the melting time greatly reduce the energy consumption of extracting rare earth elements from NdFeB waste, and the economic benefits are remarkable.

(4) The separation of rare earth elements and the main element Fe in the present invention is implemented in a molten salt system without generating waste acid and waste water, thereby overcoming the problem of serious environmental pollution in the existing recycling technology.

DETAILED DESCRIPTION OF THE INVENTION

The present invention will be further described below in conjunction with embodiments.

Example 1

Provided was a molten salt system for recovering rare earth elements from NdFeB waste, including the following components in percentage by weight: 40% of $Na_3AlF_6$, 40% $KBe_2F_5$, and 20% of $KAlF_4$.

A method for recovering rare earth elements from NdFeB waste was as follows.

The NdFeB waste was crushed into fine particles with a particle size of about 3-5 mm, the molten salt system was then added at a ratio of 1:10, and the mixture was mixed thoroughly and then loaded in an electric furnace for roasting. When the material was heated up to about 330° C., the liquid phase began to appear. As the temperature rose, the liquid phase gradually increased, and the fluidity of the material was improved. Then, the material was rapidly heated to 950° C. within 10 min, and in this case, the material components of the molten salt system were all in a molten state. This temperature was held for 2 h so that rare earth elements in the NdFeB waste were fluorinated into rare earth fluorides which were dissolved in the molten salt and Fe element in the NdFeB waste deposited in a lower layer of the molten salt in the form of oxides. Through solid-liquid separation, the upper molten salt was poured out, and then the solid was washed with dilute hydrochloric acid to remove the molten salt sticking to the surface. In this way, the rare earth fluorides were separated from the precipitate. The solid precipitate obtained was ferric oxide and the rare earth elements in NdFeB waste were thus recovered.

After testing, the content of rare earth elements in the solid precipitate was less than 0.1%. The solid precipitate was then dissolved with concentrated sulfuric acid, and excess ammonium bicarbonate was added to convert Fe into carbonates. Calcination was then carried out by using a suspension low-temperature instantaneous firing system (the system is a prior art disclosed in ZL 201110100752.1) at a temperature of 800-900° C., thus obtaining ferric oxide with a purity of 99.5%. The recovery rate of Fe was 99%. The Ferric oxide obtained could be used as a main element of a manganese-zinc ferrite.

The liquid molten salt after solid-liquid separation was cooled to room temperature and then crushed and ball-milled to more than 200 meshes. Sodium hydroxide was then added according to a mass ratio of molten salt to sodium hydroxide being 1:1. The material was roasted for conversion at 350° C. for 2 h and then cooled to room temperature. Water was added to wash away water-soluble salts of fluorine, aluminum, beryllium, potassium, sodium and the like. The material was filtered, 2 mol/L hydrochloric acid was added to the residue to leach rare earth elements, and filtering was then carried out to obtain pure rare earth element solutions (chlorides of rare earth elements) with an impurity content less than 0.5%. The mass ratio of hydrochloric acid added to the filter residue was 15:1, and the reaction was carried out at 90° C. for 0.5 h. After the filtrate was concentrated and enriched, pure neodymium rare earth solution, praseodymium rare earth solution, and dysprosium rare earth solution were separated by using P507 extraction resin, which was a mature technology.

After the pure single rare earth element solutions were separated, the neodymium rare earth solution was converted into neodymium carbonate by using ammonium bicarbonate as a precipitant, and the neodymium carbonate was then calcined in a rotary kiln at a temperature of 1100-1250° C. for 2-3 h to obtain pure neodymium oxide with a purity of 99.6%. The praseodymium rare earth solution was converted into praseodymium oxalate by using oxalic acid as a precipitant, and the praseodymium oxalate was then calcined in a rotary kiln at a temperature of 750-1150° C. for 2.5-3.5 h to obtain pure praseodymium oxide with a purity of 99.5%. The dysprosium rare earth solution was converted into dysprosium oxalate by using oxalic acid as a precipitant, and the dysprosium oxalate was calcined in a rotary kiln at 700-900° C. for 2-3 h to obtain pure dysprosium oxide with a purity of 99.3%. The obtained products could be used as doping elements in the preparation of a manganese-zinc ferrite.

Example 2

Provided was a molten salt system for recovering rare earth elements from NdFeB waste, including the following components in percentage by weight: 40% of $Na_3AlF_6$, 40% $KBe_2F_5$, and 20% of $KAlF_4$.

A method for recovering rare earth elements from NdFeB waste was as follows.

The NdFeB waste was crushed into fine particles with a particle size of about 3-5 mm, the molten salt system was then added at a ratio of 1:10, and the mixture was mixed thoroughly and then loaded in an electric furnace for roasting. When the material was heated up to about 330° C., the liquid phase began to appear. As the temperature rose, the liquid phase gradually increased, and the fluidity of the material was improved. Then, the material was rapidly heated to 900° C. within 10 min, and in this case, the material components of the molten salt system were all in a molten state. This temperature was held for 3 h so that rare earth elements in the NdFeB waste were fluorinated into rare earth fluorides which were dissolved in the molten salt and Fe element in the NdFeB waste was deposited in a lower layer of the molten salt in the form of oxides. Through solid-liquid separation, the upper molten salt was poured out, and then the solid was washed with dilute hydrochloric acid to remove the molten salt sticking to the surface. In this way, the rare earth fluorides were separated from the precipitate. The solid precipitate obtained was ferric oxide and the rare earth elements in NdFeB waste were thus recovered.

After testing, the content of rare earth elements in the solid precipitate was less than 0.1%. The solid precipitate was then dissolved with concentrated sulfuric acid, and excess ammonium bicarbonate was added to convert Fe into carbonates. Calcination was then carried out by using a suspension low-temperature instantaneous firing system (the system is a prior art disclosed in ZL 201110100752.1) at a temperature of 800-900° C., thus obtaining ferric oxide with a purity of 99.5%. The recovery rate of Fe was 99%. The Ferric oxide obtained could be used as a main element of a manganese-zinc ferrite.

The liquid molten salt after solid-liquid separation was cooled to room temperature and then crushed and ball-milled to more than 200 meshes. Sodium hydroxide was then added according to a mass ratio of molten salt to sodium hydroxide being 1:1. The material was roasted for conversion at 300° C. for 4 h and then cooled to room temperature. Water was added to wash away water-soluble salts of fluorine, aluminum, beryllium, potassium, sodium and the like. The material was filtered, 6 mol/L hydrochloric acid was added to the residue to leach rare earth elements, and filtering was then carried out to obtain pure rare earth element solutions (chlorides of rare earth elements) with an impurity content less than 0.5%. The mass ratio of hydrochloric acid added to the filter residue was 5:1, and the reaction was carried out at 25° C. for 2 h. After the filtrate was concentrated and enriched, pure neodymium rare earth solution, praseodymium rare earth solution, and dysprosium rare earth solution were separated by using P507 extraction resin, which was a mature technology.

After the single rare earth element solutions were separated, the neodymium rare earth solution was converted into neodymium carbonate by using ammonium bicarbonate as a precipitant, and the neodymium carbonate was then calcined in a rotary kiln at a temperature of 1100-1250° C. for 2-3 h to obtain pure neodymium oxide with a purity of 99.6%. The praseodymium rare earth solution was converted into praseodymium oxalate by using oxalic acid as a precipitant, and the praseodymium oxalate was then calcined in a rotary kiln at a temperature of 750-1150° C. for 2.5-3.5 h to obtain pure praseodymium oxide with a purity of 99.5%. The dysprosium rare earth solution was converted into dysprosium oxalate by using oxalic acid as a precipitant, and the dysprosium oxalate was calcined in a rotary kiln at 700-900° C. for 2-3 h to obtain pure dysprosium oxide with a purity of 99.3%. The obtained products could be used as doping elements in the preparation of a manganese-zinc ferrite.

Example 3

Provided was a molten salt system for recovering rare earth elements from NdFeB waste, including the following components in percentage by weight: 40% of $K_3AlF_6$, 40% $KBe_2F_5$, and 20% of $KAlF_4$.

A method for recovering rare earth elements from NdFeB waste was as follows.

The NdFeB waste was crushed into fine particles with a particle size of about 3-5 mm, the molten salt system was then added at a ratio of 1:10, and the mixture was mixed thoroughly and then loaded in an electric furnace for roasting. When the material was heated up to about 330° C., the liquid phase began to appear. As the temperature rose, the liquid phase gradually increased, and the fluidity of the material was improved. Then, the material was rapidly heated to 800° C. within 10 min, and in this case, the material components of the molten salt system were all in a molten state. This temperature was held for 3 h so that rare earth elements in the NdFeB waste were fluorinated into rare earth fluorides which were dissolved in the molten salt and Fe element in the NdFeB waste was deposited in a lower layer of the molten salt in the form of oxides. Through solid-liquid separation, the upper molten salt was poured out, and then the solid was washed with dilute hydrochloric acid to remove the molten salt sticking to the surface. In this way, the rare earth fluorides were separated from the precipitate. The solid precipitate obtained was ferric oxide and the rare earth elements in NdFeB waste were thus recovered.

After testing, the content of rare earth elements in the solid precipitate was less than 0.1%. The solid precipitate was then dissolved with concentrated sulfuric acid, and excess ammonium bicarbonate was added to convert Fe into carbonates. Calcination was then carried out by using a suspension low-temperature instantaneous firing system (the system is a prior art disclosed in ZL 201110100752.1) at a temperature of 800-900° C., thus obtaining ferric oxide with a purity of 99.5%. The recovery rate of Fe was 99%. The Ferric oxide obtained could be used as a main element of a manganese-zinc ferrite.

The liquid molten salt after solid-liquid separation was cooled to room temperature and then crushed and ball-milled to more than 200 meshes. Sodium hydroxide was then added according to a mass ratio of molten salt to sodium hydroxide being 1:1. The material was roasted for conversion at 350° C. for 4 h and then cooled to room temperature. Water was added to wash away water-soluble salts of fluorine, aluminum, beryllium, potassium, sodium and the like. The material was filtered, 6 mol/L hydrochloric acid was added to the residue (the mass ratio of the hydrochloric acid added to the filter residue was 5:1) to react at 25° C. for 2 h to leach rare earth elements, and filtering was then carried out. After the filtrate was concentrated and enriched, pure neodymium rare earth solution, praseodymium rare earth solution, and dysprosium rare earth solution were separated by using P507 extraction resin, which was a mature technology.

After the single pure rare earth element solutions were separated, the neodymium rare earth solution was converted into neodymium carbonate by using ammonium bicarbonate as a precipitant, and the neodymium carbonate was then calcined in a rotary kiln at a temperature of 1100-1250° C. for 2-3 h to obtain pure neodymium oxide with a purity of 99.6%. The praseodymium rare earth solution was converted into praseodymium oxalate by using oxalic acid as a precipitant, and the praseodymium oxalate was then calcined in a rotary kiln at a temperature of 750-1150° C. for 2.5-3.5 h to obtain pure praseodymium oxide with a purity of 99.5%. The dysprosium rare earth solution was converted into dysprosium oxalate by using oxalic acid as a precipitant, and the dysprosium oxalate was calcined in a rotary kiln at 700-900° C. for 2-3 h to obtain pure dysprosium oxide with a purity of 99.3%. The recovery rate was 98%. The obtained products could be used as doping elements in the preparation of a manganese-zinc ferrite.

Example 4

Provided was a molten salt system for recovering rare earth elements from NdFeB waste, including the following components in percentage by weight: 40% of $K_3AlF_6$, 40% $KBe_2F_5$, and 20% of $KAlF_4$.

A method for recovering rare earth elements from NdFeB waste was as follows.

The NdFeB waste was crushed into fine particles with a particle size of about 3-5 mm, the molten salt system was then added at a ratio of 1:10, and the mixture was mixed thoroughly and then loaded in an electric furnace for roasting. When the material was heated up to about 330° C., the liquid phase began to appear. As the temperature rose, the liquid phase gradually increased, and the fluidity of the material was improved. Then, the material was rapidly heated to 850° C. within 10 min, and in this case, the material components of the molten salt system were all in a molten state. This temperature was held for 1 h so that rare earth elements in the NdFeB waste were fluorinated into rare earth fluorides which were dissolved in the molten salt and Fe element in the NdFeB waste was deposited in a lower layer of the molten salt in the form of oxides. Through solid-liquid separation, the upper molten salt was poured out, and then the solid was washed with dilute hydrochloric acid to remove the molten salt sticking to the surface. In this way, the rare earth fluorides were separated from the precipitate. The solid precipitate obtained was ferric oxide and the rare earth elements in NdFeB waste were thus recovered.

After testing, the content of rare earth elements in the solid precipitate was less than 0.1%. The solid precipitate was then dissolved with concentrated sulfuric acid, and excess ammonium bicarbonate was added to convert Fe into carbonates. Calcination was then carried out by using a suspension low-temperature instantaneous firing system (the system is a prior art disclosed in ZL 201110100752.1) at a temperature of 800-900° C., thus obtaining ferric oxide with a purity of 99.5%. The recovery rate of Fe was 99%. The Ferric oxide obtained could be used as a main element of a manganese-zinc ferrite.

The liquid molten salt after solid-liquid separation was cooled to room temperature and then crushed and ball-milled to more than 200 meshes. Sodium hydroxide was then added according to a mass ratio of molten salt to sodium hydroxide being 1:1. The material was roasted for conversion at 450° C. for 2 h and then cooled to room temperature. Water was added to wash away water-soluble salts of fluorine, aluminum, beryllium, potassium, sodium and the like. The material was filtered, 2 mol/L hydrochloric acid was added to the residue (the mass ratio of the hydrochloric acid added to the filter residue was 15:1) to react at 90° C. for 0.5 h to leach rare earth elements (chlorides of rare earth elements) with an impurity content less than 0.5%, and filtering was then carried out. After the filtrate was concentrated and enriched, pure neodymium rare earth solution, praseodymium rare earth solution, and dysprosium rare earth solution were separated by using P507 extraction resin, which was a mature technology.

After the single pure rare earth element solutions were separated, the neodymium rare earth solution was converted into neodymium carbonate by using ammonium bicarbonate as a precipitant, and the neodymium carbonate was then calcined in a rotary kiln at a temperature of 1100-1250° C. for 2-3 h to obtain pure neodymium oxide with a purity of 99.6%. The praseodymium rare earth solution was converted into praseodymium oxalate by using oxalic acid as a precipitant, and the praseodymium oxalate was then calcined in a rotary kiln at a temperature of 750-1150° C. for 2.5-3.5 h to obtain pure praseodymium oxide with a purity of 99.5%. The dysprosium rare earth solution was converted into dysprosium oxalate by using oxalic acid as a precipitant, and the dysprosium oxalate was calcined in a rotary kiln at 700-900° C. for 2-3 h to obtain pure dysprosium oxide with a purity of 99.3%. The recovery rate was 98%. The obtained products could be used as doping elements in the preparation of a manganese-zinc ferrite.

While the embodiments of the present invention have been shown and described, it will be understood by those skilled in the art that the various modifications, changes, substitutions and variations of the embodiments may be made without departing from the spirit and scope of the invention. The scope of the invention is defined by the appended claims and their equivalents.

What is claimed is:

1. A method for recovering rare earth elements from NdFeB waste, comprising the following steps:
   1) Crushing NdFeB waste into fine particles with a particle size of 3-5 mm, thoroughly mixing the fine particles with a molten salt system, the molten salt system comprising the following components in percentage by weight: 40% of $K_3AlF_6$ or $Na_3AlF_6$, 40% of $KBe_2F_5$, and 20% of $KAlF_4$;

heating the mixture in an electric furnace to 330° C. until the three-component molten salt system begins to melt, wherein as the temperature rises, a liquid phase gradually increases, and the fluidity of the material is improved; and 2) Then, rapidly heating the material to 800-850° C. or 900-950° C. within 10 min, holding the temperature for 1-3 h so that rare earth elements in the NdFeB waste are fluorinated into rare earth fluorides which are dissolved in the molten salt and Fe element in the NdFeB waste deposits in a lower layer of the molten salt in the form of oxides; and carrying out solid-liquid separation to separate the rare earth fluorides from the precipitate to obtain a solid precipitate ferric oxide, thereby realizing the separation of Fe from rare earth elements; cooling the liquid molten salt after solid-liquid separation to room temperature and then crushing and ball-milling the molten salt to more than 200 meshes; adding sodium hydroxide according to a mass ratio of molten salt to sodium hydroxide being 1:1 and roasting the material for conversion at 300-450° C. for 2-4 h and then cooling the material to room temperature; adding water to wash away water-soluble salts of fluorine, aluminum, beryllium, potassium, sodium and the like; filtering the material, adding 2-6 mol/L hydrochloric acid to the residue to leach rare earth elements, and carrying out filtering to obtain pure rare earth element solutions.

2. The method for recovering rare earth elements from NdFeB waste according to claim 1, wherein the mass ratio of the hydrochloric acid added to the filter residue is 15:1-5:1.

3. The method for recovering rare earth elements from NdFeB waste according to claim 2, wherein after the addition of hydrochloric acid, the reaction is carried out at a temperature of 25-90° C. for 0.5-2 h.

4. The method for recovering rare earth elements from NdFeB waste according to claim 3, wherein the mass ratio of the NdFeB waste to the molten salt system is 1:10.

* * * * *